Patented July 10, 1951

2,560,046

UNITED STATES PATENT OFFICE 2,560,046

PREPARATION OF THIOAMIDES

Glen Alliger, Boston Heights, Ohio, assignor to The Firestone Tire & Rubber Company, Akron, Ohio, a corporation of Ohio No Drawing. Application December 30, 1948, Serial No. 68,430

7 Claims. (Cl. 260—345)

This invention relates to the preparation of thioamides by condensation of aliphatic N-haloamines and carbodithioic acid salts, i. e. acids which include the group —C—CSSH. The thioamides have potential value as rubber chemicals and intermediates for the production of rubber chemicals.

The reaction is preferably carried out with the haloamine in aqueous suspension and the following equation is illustrative of the reaction:

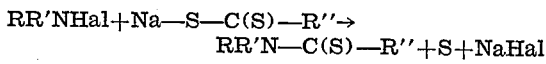

in which R, R' and R'' have any of the values attributed to them in what follows.

Although generally a primary N-haloamine will be used in carrying out the reaction, secondary N-haloamines may be employed. The N-halo primary aliphatic amines are represented by the formula:

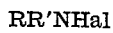

in which Hal stands for chlorine, bromine or iodine and R and R' represent hydrogen or an aliphatic radical or may be joined to form a ring (as in morpholine and piperidine). The aliphatic radical may be cyclic (e. g., cyclohexyl, cyclopentyl, etc.). It may be unsubstituted or it may be benzyl, furyl, etc. It may be saturated or unsaturated. Thus the amines which may be used include, for example, N-chloromethylamine, N-chloroethylamine, N-chloropropylamine, the N-chlorobutylamines, the N-chloroamylamines (including N - chlorocyclopentylamine), the N-chlorohexylamines (including N - chlorocyclohexylamine), the N - chloro - octylamines, N-chloro - diethylamine, N - chloro-dipropylamine, the N-chloro-dibutylamines, the N-chloro-diamylamines, the N-chloro-dihexylamines, the N-chloro-diheptylamines, the N-chlorodioctyl-amines, N-chlorodicyclohexylamine, N-chloro-allylamine, N-chloromethallylamine, N-chloro-crotonylamine, N-chlorofurfurylamine, N-chloro-tetrahydrofurfurylamine, N-chlorobenzylamine, N-bromomethylamine, N-iodomethylamine, N-chloropiperidiene, N - chloromorpholine, etc. Thus, the invention includes the use of the N-haloamines including the N-chloro-, N-bromo-, and N-iodo-aliphatic amines, whether saturated or unsaturated, whether cyclic or noncyclic, and whether substituted or unsubstituted. Ordinarily, the amines containing up to, for example, eight carbon atoms can be used in aqueous suspensions, but for longer-chain compounds such as N-chlorohexadecylamine, N-chlorooctadecyl-amine, etc., the solubility of the unchlorinated amines in the aqueous phase of the suspension is so low that some other solvent will be required in the continuous phase to give satisfactory results.

The reaction is carried out with any soluble salt of a carbodithioic acid. In carrying out the reaction in a suspension the continuous phase of which is water, the sodium, ammonium, potassium or lithium salt will ordinarily be used although any soluble alkali metal or alkaline earth metal salt such as calcium, etc. may be used. The acids which may be employed include, for example, dithiobenzoic acid, the dithio-alphanaphthoic acids, dithio-p-toluic acid, dithio-alpha-furoic acid, dithio-p-chlorobenzoic acid, dithio-2,4-dichlorobenzoic acid, dithio-p-nitrobenzoic acid, dithio-beta-chloro-alpha-naphthoic acid, dithio-p-phenylbenzoic acid, dithio-2-methyl-4-ethyl-benzoic acid, dithio-tetrahydrofuroic acid, dithio-acetic acid, the dithiobutyric acids, thiophenylacetic acid, thiochloroacetic acid, terpenyl-carbodithioic acid, dithio-beta-naphthoic acid, dithio-abietic acid, dithionicotinic acid, dithio-thiophene carboxylic acids, etc.

The following examples are illustrative, and other N-haloamines and carbodithioic acid salts may be used in carrying out the reaction:

Example I

*N-cyclohexylthiofuramide.*—A suspension of N-monochlorocyclohexylamine was prepared at —10° by adding 0.23 mole of sodium hypochlorite (86.8 ml. of a 2.65 molar solution) to 0.25 mole of cyclohexylamine with stirring. To this suspension was added, also with stirring, a solution of 28.8 g. (0.2 mole) of dithiofuroic acid in 100 ml. of ten per cent sodium hydroxide solution. The solid precipitate was filtered off, washed with water and dried. The material weighed 43 g., a quantitative yield. After several recrystallizations from petroleum ether the material melted at 81–82° C.

Calc'd for $C_{11}H_{15}OSN$: N, 6.70; S, 15.3
Found: N, 6.88; S, 15.3

Example II

*N-cyclohexylthiobenzamide.*—An aqueous suspension of N-monochlorocyclohexylamine was prepared by adding with stirring 20.5 ml. of a 2.67 molar solution (0.053 mole) of sodium hypochlorite to 10 g. (0.10 mole) of cyclohexylamine. The temperature was maintained at —10° C. throughout the reaction. To this suspension was added an aqueous solution of 8.8 g. (0.05 mole) of sodium dithiobenzoate slowly and with stirring at −10° C. An oil formed from which the aqueous medium was removed by decantation. The oil was washed with several portions of water and triturated with gasoline, forming a yellow solid which was filtered off. It melted at 89–91° C. After one recrystallization from gasoline the melting point was 91–92° C. A mixed-melting-point determination with a known sample of N-cyclohexylthiobenzamide showed no depression.

What I claim is:

1. The method of preparing a thioamide which comprises condensing a salt of an acid which includes the group —C—CSSH with an N-halo-amine of the formula RR′NHal, where Hal is of the group consisting of chlorine, bromine and iodine and R and R′ are of the group consisting of hydrogen, the aliphatic radicals, and radicals in which R and R′ form a ring, and R and R′ are not both hydrogen.

2. The method of forming a thioamide which comprises condensing an N-halo-aliphatic amine with a salt of an acid which includes the group —C—CSSH.

3. The method of preparing a thioamide which comprises condensing an N-chloro-aliphatic amine with a salt of an acid which includes the group —C—CSSH.

4. The method of preparing a thioamide which comprises condensing an N-mono-chloro-aliphatic amine with a salt of an acid which includes the group —C—CSSH.

5. The method of preparing a thioamide which comprises condensing an N-monochloro primary alkyl amine with a salt of an acid which includes the group —C—CSSH.

6. The method of preparing a thioamide which comprises condensing a salt of dithiofuroic acid with an N-monochloro primary alkyl amine.

7. The method of preparing a thioamide which comprises condensing a salt of dithiobenzoic acid with an N-monochloro primary alkyl amine.

GLEN ALLIGER.

REFERENCES CITED

The following references are of record in the file of this patent:

UNITED STATES PATENTS

| Number | Name | Date |
|---|---|---|
| 2,333,468 | Cooper | Nov. 2, 1943 |
| 2,421,352 | Paul et al. | May 27, 1947 |